US010021166B2

(12) United States Patent
Kumar

(10) Patent No.: US 10,021,166 B2
(45) Date of Patent: Jul. 10, 2018

(54) MECHANISM FOR BUILDING NORMALIZED SERVICE MODEL TO EXPOSE WEB APIS

(71) Applicant: CA, INC., New York, NY (US)

(72) Inventor: Garimella Anila Kumar, Hyderabad (IN)

(73) Assignee: CA, INC., New York, NY (US)

( * ) Notice: Subject to any disclaimer, the term of this patent is extended or adjusted under 35 U.S.C. 154(b) by 342 days.

(21) Appl. No.: 14/850,562

(22) Filed: Sep. 10, 2015

(65) Prior Publication Data

US 2017/0078360 A1 Mar. 16, 2017

(51) Int. Cl.

| | |
|---|---|
| ***G06F 15/16*** | (2006.01) |
| ***H04L 29/08*** | (2006.01) |
| ***G06F 9/00*** | (2006.01) |
| ***G06F 17/30*** | (2006.01) |

(52) U.S. Cl.

CPC ................ *H04L 67/02* (2013.01); *G06F 9/00* (2013.01); *G06F 17/30* (2013.01); *H04L 67/2823* (2013.01)

(58) Field of Classification Search

CPC ..... H04L 29/08; H04L 67/2823; H04L 67/02; H04L 67/32; G06F 17/3089; G06F 9/00

See application file for complete search history.

(56) References Cited

U.S. PATENT DOCUMENTS

| | | | | |
|---|---|---|---|---|
| 8,701,129 | B2 | 4/2014 | Nobuoka | |
| 8,918,452 | B2 | 12/2014 | Nielsen | |
| 2006/0155869 | A1 * | 7/2006 | Nanduri | H04L 63/166 709/232 |
| 2007/0288247 | A1 * | 12/2007 | Mackay | G06Q 10/00 705/1.1 |
| 2013/0080505 | A1 * | 3/2013 | Nielsen | G06F 9/546 709/203 |
| 2013/0160130 | A1 * | 6/2013 | Mendelev | G06F 21/56 726/25 |
| 2016/0088077 | A1 * | 3/2016 | Liu | H04L 67/1095 709/203 |

* cited by examiner

*Primary Examiner* — Benjamin M Thieu

(74) *Attorney, Agent, or Firm* — Vierra Magen Marcus LLP

(57) ABSTRACT

Systems and methods for generating and using a normalized service model metadata repository to translate web APIs are described. In some embodiments, a normalized service model generator may allow an application to expose web APIs in new formats and/or standards that were unknown during development of the application and without requiring a change of code to the application to support the new formats and/or standards. In some cases, code or programming instructions associated with an application may include annotations (e.g., Java annotations) that classify whether particular methods or functions within the code correspond with a particular operation and specify relationships between objects or entities within the code. An annotation processor may process the code in order to extract entity relationships and service models exposed by the application and to generate a normalized metadata repository that may be translated into any kind of web API.

18 Claims, 9 Drawing Sheets

302

```
public class UserModule {

  @GetEntities(type = User.class)        310
  public Collection<User> getUsers() {
    // TODO: Fetch Users List and Return
    return null;
  }

  @GetEntity(type = User.class)          311
  public User getUser(Id id) {
    // TODO: Fetch User by ID and return
    return null;
  }

  @CreateEntity(type = User.class)       312
  public User createUser(User user) {
    // TODO: Create a new User and return created User Object
    return user;
  }

  @MergeEntity(type = User.class)        313
  public void patchUser(Id id, User user) {
    // TODO: Partially update User properties from input object
  }

  @UpdateEntity(type = User.class)       314
  public void updateUser(Id id, User user) {
    // TODO: Update User Object & return
  }

  @DeleteEntity(type = User.class)       315
  public void deleteUser(Id id) {
    // TODO: delete user object by id
  }
}
```

```
public class UserRoleModule {
                                                          330
   @GetProperty(type = User.class, property = "roles")
   public Collection<Role> getUserRoles(Id id) {
      // TODO: get roles of a User with ID and return the list of roles
      return null;
   }
                                                                331
   @CreateRelationship(type = User.class, property = "roles")
   public void addRole(Id userId, Id roleId) {
      // TODO: add a new role to user
   }
                                                                332
   @UpdateRelationship(type = User.class, property = "roles")
   public void updateRole(Id userId, Id oldRoleId, Id newRoleId) {
      // TODO: replace old role with new role for a user
   }
                                                                333
   @DeleteRelationship(type = User.class, property = "roles")
   public void deleteRole(Id userId, Id roleId) {
      // TODO: delete role for a user
   }

}
```

```
public class RoleModule {

   @GetEntities(type = Role.class)          350
   public Collection<Role> getRoles() {
      // TODO: Fetch Roles List and Return
      return null;
   }

   @GetEntity(type = Role.class)          351
   public Role getRole(Id id) {
      // TODO: Fetch Role by ID and return
      return null;
   }

   @CreateEntity(type = Role.class)          352
   public Role createRole(Role Role) {
      // TODO: Create a new Role and return created Role Object
      return Role;
   }

   @MergeEntity(type = Role.class)          353
   public void patchRole(Id id, Role Role) {
      // TODO: Partially update Role properties from input object
   }

   @UpdateEntity(type = Role.class)          354
   public void updateRole(Id id, Role Role) {
      // TODO: Update Role Object & return
   }

   @DeleteEntity(type = Role.class)          355
   public void deleteRole(Id id) {
      // TODO: delete Role object by id
   }

}
```

```
{
  "swagger": "2.0",
  "host": "localhost:7000",
  "basePath": "/system/opatent/",
  "schemes": [
    "http",
    "https"
  ],

. . .

   "definitions": {
     "User": {
     "id": "User",
     "required": [
       "email"
     ],
     "properties": {
       "address": {
         "$ref": "#/definitions/Address"
       },
       "age": {
         "type": "integer",
         "format": "int32"
       },
       "email": {
         "type": "string"
       },
       "name": {
         "type": "string"
       },
       "roles": {
         "type": "array",
         "items": {
           "$ref": "#/definitions/Role"
         }
       }
     }
   },
```

FIG. 3D

MECHANISM FOR BUILDING NORMALIZED SERVICE MODEL TO EXPOSE WEB APIS

BACKGROUND

The present disclosure relates to systems and methods for generating and using normalized service models to expose web application programming interfaces (APIs).

Web services may refer to client and server applications that communicate with each other over the Internet using the HyperText Transfer Protocol (HTTP). In some cases, different applications (or software systems) may need to exchange data with each other and a web service may provide a method of communication that allows the different applications to exchange the data over the Internet. An application that requests data may be referred to as a service requester and an application that processes the request and provides the data may be referred to as a service provider. An application programming interface (API) may comprise a set of routines, protocols, and/or programming instructions for communicating with a software application (e.g., retrieving data from a web-based email application). A web API may allow service requesters or users to perform create, read, update, or delete (CRUD) operations using HTTP. A web API may comprise a server-side web API for a web server (e.g., a hardware server or an application that provides web pages to clients) or a client-side web API for a web browser (e.g., a software application for retrieving and displaying web pages). In one example, a server-side web API may comprise an application programming interface for a request-response message system that is exposed using an HTTP-based web server and expressed using JavaScript Object Notation (JSON) or Extensible Markup Language (XML).

BRIEF SUMMARY

According to aspects of the present disclosure, technology for generating and using normalized service models to expose web application programming interfaces (APIs) is disclosed.

Technology is described for generating and using a normalized service model metadata repository to translate web APIs. In some embodiments, a normalized service model generator may allow an application to expose web APIs in new formats and/or standards that were unknown during development of the application and without requiring a change of code to the application to support the new formats and/or standards. In some cases, code or programming instructions associated with an application may include annotations (e.g., Java annotations or other metadata embedded within the code) that classify whether particular methods or functions within the code correspond with a particular operation (e.g., a create entity operation, a get entity operation, or a delete entity operation) and specify relationships between objects or entities within the code (e.g., between a User entity and a Role entity). During a startup procedure, an annotation processor may process the code in order to extract entity relationships and service models exposed by the application and to generate a normalized metadata repository that may be translated into any kind of web API.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

FIG. 3A depicts one embodiment of a portion of an annotated program module.

FIG. 3B depicts another embodiment of a portion of an annotated program module.

FIG. 3C depicts an alternative embodiment of a portion of an annotated program module.

FIG. 3D depicts one embodiment of a portion of an output file generated using a normalized service model metadata repository.

DETAILED DESCRIPTION

Figure 1:
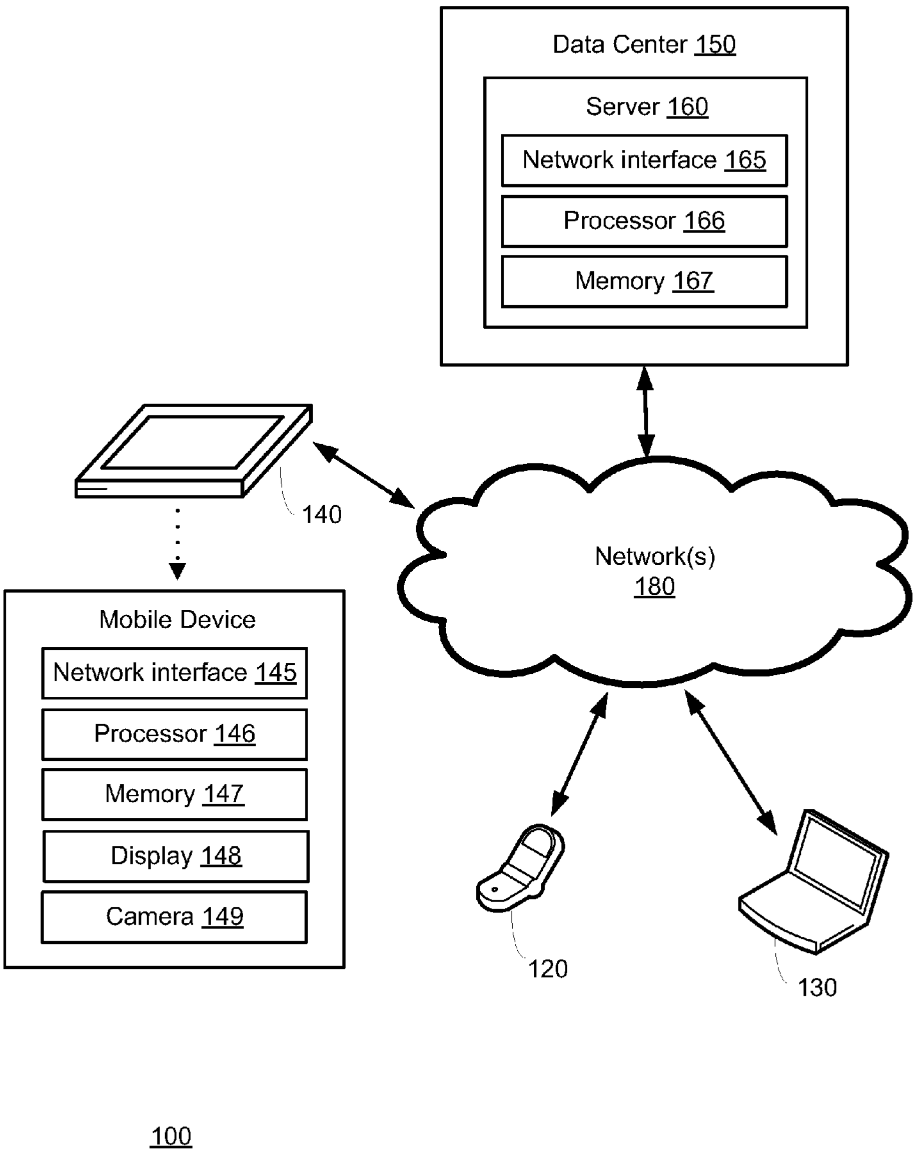
FIG. 1 is a block diagram of one embodiment of a networked computing environment.

As will be understood by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for generating and using a normalized service model metadata repository to translate web APIs. In some embodiments, a normalized service model generator may allow an application to expose web APIs in new formats and/or standards that were unknown during development of the application and without requiring a change of code to the application to support the new formats and/or standards. In some cases, code or programming instructions associated with an application may include annotations (e.g., Java annotations or other metadata embedded within the code) that classify whether particular methods or functions within the code correspond with a particular operation (e.g., a create entity operation, a get entity operation, or a delete entity operation) and specify relationships between objects or entities within the code (e.g., between a User entity and a Role entity or between a User object and a Role object). During a startup procedure, an annotation processor may process the code in order to extract entity relationships and service models exposed by the application and to generate a normalized metadata repository that may be translated into any kind of web API in response to requests made by service requesters.

In some cases, a normalized service model metadata repository generated from annotated programming modules may include a listing of entities, entity properties, entity relationship mappings specifying relationships between the entities, and the various operations supported by the entities. In one example, a first entity extracted from the annotated programming modules may comprise a User entity that has a relationship with a Role entity and the User entity may support update, create, and delete operations. In some cases, the annotated programming modules may comprise Java code and the normalized service model generator may be deployed inside a Java container and be used for exposing Open Data Protocol (OData) REST APIs. OData may allow a client to make requests and get responses from an OData service using RESTful interactions (e.g., CRUD operations). The output files or the data output from the OData service may be represented using XML or JSON.

One benefit of using a normalized service model metadata repository to translate web APIs and to allow applications to expose web APIs in new formats or standards without requiring a change to application code is that new web APIs may be quickly supported by the applications (e.g., leading to improved developer productivity) and protocol updates need not cause changes to production code for the application (e.g., leading to improved system stability).

FIG. 1 is a block diagram of one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile device 120, mobile device 130, mobile device 140, and server 160. The mobile device 140 may comprise a mobile phone, smart device (e.g., an electronic watch with a touchscreen interface), or tablet computer. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. The one or more networks 180 may include a cellular network, a mobile network, or a wireless network. Each network of the one or more networks 180 may include hubs, bridges, routers, switches, and wired transmission media such as a wired network or direct-wired connection.

One embodiment of mobile device 140 includes a network interface 145, processor 146, memory 147, display 148, and camera 149, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, Flash, etc.). Memory 147 may comprise a hardware storage device. Display 148 may comprise a touch-screen display. The touch-screen display may provide a touchscreen interface for controlling the mobile device 140 or for accessing data using the mobile device 140. Camera 149 may include an image sensor for capturing images. Camera 149 may capture color images of an environment. The camera 149 may comprise an image capturing device for capturing one or more images of an environment or an object within the environment. The mobile device 140 may include outward facing cameras that capture images of the environment and/or inward facing cameras that capture images of the end user of the mobile device.

The data center 150 may include one or more servers, such as server 160, in communication with one or more storage devices. The servers and data storage devices within a data center may be in communication with each other via a networking fabric connecting servers data storage units within the data center to each other. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Memory 167 may comprise a hardware storage device.

In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

Networked computing environment 100 may provide a cloud computing environment for one or more computing devices. Cloud computing may refer to Internet-based computing, wherein shared resources, software, and/or information are provided to one or more computing devices on-demand via the Internet (or other global network). In some embodiments, a server, such as server 160, may act as an authentication server for determining whether access to a resource (e.g., an application, a database, a file, a webpage, a computer program, a file system, a server, or a storage device) should be granted to a client and to transmit data associated with the resource to the client.

In some embodiments, a server, such as server 160, may generate and store a normalized service model metadata repository. The normalized service model metadata repository may be used by the server to translate web APIs and generate various output files (e.g., XML files or JSON files) to be transmitted to clients. In order to generate the normalized metadata repository, an annotation processor may process code associated with an application and extract entities and entity relationships using annotations embedded within the code (e.g., Java annotations) that classify whether particular methods or functions within the code correspond with a particular operation (e.g., a create entity operation, a get entity operation, or a delete entity operation) and that specify entity relationships between objects or entities (e.g., between a User entity and a Role entity defined within the code).

Figure 2:
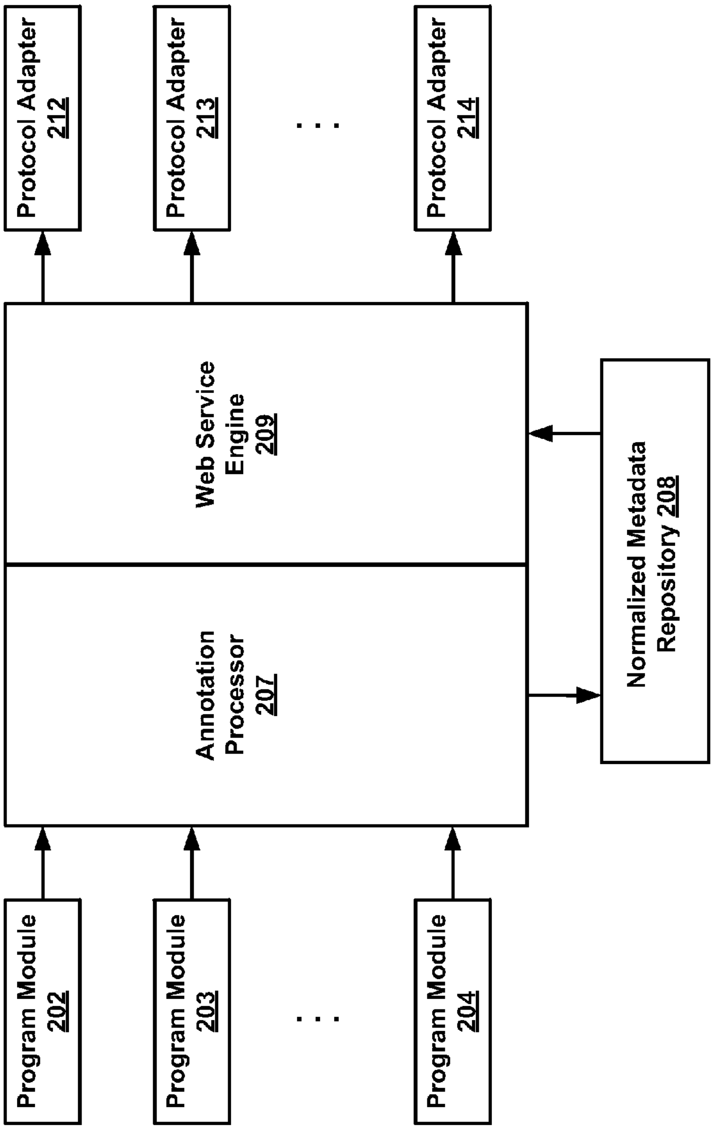
FIG. 2 depicts one embodiment of a system for generating and using a normalized service model metadata repository to translate web APIs.

FIG. 2 depicts one embodiment of a system for generating and using a normalized service model metadata repository to translate web APIs. As depicted, the system may include program modules 202-204 (e.g., Java code including annotations), an annotation processor 207 (e.g., implemented using a Java container), a normalized metadata repository 208 (e.g., a file or a database stored on a server), a web service engine 209 (e.g., running on the server for receiving and responding to requests made by service requesters), and protocol adapters 212-214 (e.g., an OData adapter). The annotation processor 207 may parse the program modules 202-204 and identify one or more annotations within the program modules 202-204. The one or more annotations may comprise Java annotations that are inserted into or arranged above methods within the program modules 202-204. The one or more annotations may be used to identify entities (e.g., a User entity), entity properties (e.g., the User entity may be associated with a Role property), entity relationships between the entities, and operations supported by the entities. The extracted entities, entity properties, entity relationships between the entities, and operations supported by the entities may be stored in a normalized service model metadata repository (e.g., a file or database), such as the normalized metadata repository 208. The normalized metadata repository 208 may include a set of entities, an entity relationship mapping for each entity of the set of entities (e.g., implemented using a lookup table), and a set of properties for each entity of the set of entities.

The web service engine 209 may receive a request from a client or a service requester for information specifying entities and various operations that may be performed on the entities using a file of a particular format (e.g., a swagger.json file). An output file of the particular format may be generated by retrieving normalized service model data from the normalized metadata repository 208 and using a protocol adapter, such as protocol adapter 212, to generate the file of the particular format by mapping the normalized service model data into the file of the particular format. The web service engine 209 may then receive a query from the client or the service requester based on data provided within the file of the particular format. In one example, a service requester may transmit a request for a file regarding car entities and various operations that may be performed using the car entities, such as "get http:// . . . /cars/swagger.json," receive the JSON file, and then transmit a query or query string for car objects satisfying various car properties, such as "get http:// . . . /cars?$filters color eq 'blue' and year eq '2010'." In another example, a service requester may transmit a request for a file regarding user objects and various operations that may be performed using the user objects, such as "get http:// . . . /users/$metadata.xml," receive the XML file, and then transmit a query for user objects satisfying various user properties, such as "get http:// . . . /users?$filters role eq 'software developer' or role eq 'manager'." A query may cause a set of objects satisfying the query to be returned or transmitted to the client or service provider.

In some embodiments, the annotation processor 207, the normalized metadata repository 208, the web service engine 209, and the protocol adapters 212-214 may comprise an API normalization engine that automatically builds normalized service models and stores the normalized service models in the normalized metadata repository 208 during a startup procedure (e.g., upon startup of a web server and servlet container such as Tomcat). Once the normalized service models have been generated and stored in the normalized metadata repository 208, the API normalization engine may output files of various formats and/or protocols using the protocol adapters 212-214 (e.g., an OData adapter) to facilitate or perform CRUD operations in response to requests from a service requester. In one example, the service requester may comprise a mobile device, such as mobile device 140 in FIG. 1, and the API normalization engine may run on a server, such as server 160 in FIG. 1.

FIG. 3A depicts one embodiment of a portion of an annotated program module 302, such as a portion of program module 202 in FIG. 2. As depicted, annotations 310-315 are used to provide metadata associated with various methods within the portion of the annotated program module 302. For example, the annotation 312 comprising @CreateEntity(type=User.class) specifies that the method createUser within the UserModule class creates an entity of type User.class. Similarly, the annotation 342 comprising @UpdateEntity(type=User.class) specifies that the method updateUser within the UserModule class may be used to update a User entity (e.g., an identification or id of the User entity).

FIG. 3B depicts one embodiment of a portion of an annotated program module 322, such as a portion of program module 203 in FIG. 2. As depicted, annotations 330-333 are used to provide metadata associated with various methods within the portion of the annotated program module 322. For example, the annotation 331 comprising @CreateRelationship(type=User.class, property="roles") specifies that the method addRole creates a relationship between a User and a Role in which a new Role may be added to a User (e.g., a roleid may correspond with a manager role). Similarly, the annotation 332 comprising @UpdateRelationship(type=User.class, property="roles") specifies that the method updateRole creates a relationship between a User and a Role in which a new Role may replace an old Role for a User.

FIG. 3C depicts one embodiment of a portion of an annotated program module 342, such as a portion of program module 204 in FIG. 2. As depicted, annotations 350-355 are used to provide metadata associated with various methods within the portion of the annotated program module 342. For example, the annotation 352 comprising @CreateEntity(type=Role.class) specifies that the method createRole within the RoleModule class creates an entity of type Role.class. Similarly, the annotation 354 comprising @UpdateEntity(type=Role.class) specifies that the method updateRole within the RoleModule class may be used to update and return a Role entity.

FIG. 3D depicts one embodiment of a portion of an output file 362 generated using a normalized service model metadata repository, such as normalized metadata repository 208 in FIG. 2. The portion of the output file 362 may represent data using a JSON format. The output file may comprise a swagger.json file. A first portion 370 of the output file may describe supported paths and definitions of types supported in requests and responses. A second portion 371 of the output file provides a definitions section showing the User type definition, its properties, and corresponding data types. For example, a User entity may have properties such as a physical address, an age, an email address, a name, and a role. In some cases, the portion of the output file 362 may be automatically generated using the normalized metadata repository 208, the web service engine 209, and one of the protocol adapters 212-214 depicted in FIG. 2 configured to generate a swagger.json file.

Figure 4A:
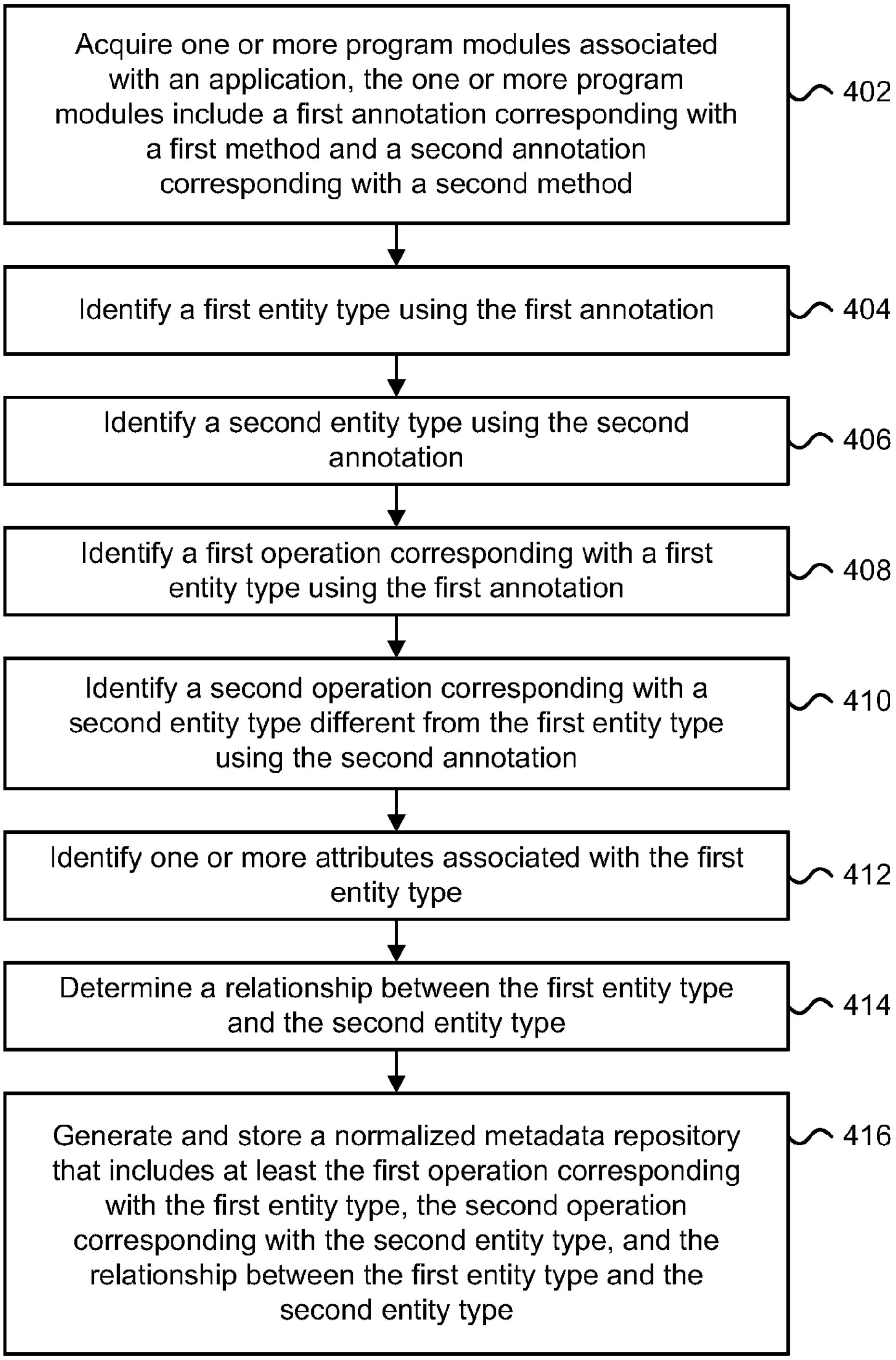
FIG. 4A is a flowchart describing one embodiment of a process for generating a normalized metadata repository.

FIG. 4A is a flowchart describing one embodiment of a process for generating a normalized metadata repository. In one embodiment, the process of FIG. 4A may be performed by a server, such as server 160 in FIG. 1.

In step 402, one or more program modules associated with an application are acquired. The one or more program modules may comprise code written in the Java programming language for implementing the application. The one or more program modules may include a first annotation corresponding with a first method and a second annotation corresponding with a second method. The first annotation may comprise a first Java annotation and the second annotation may comprise a second Java annotation.

In step 404, a first entity type is identified using the first annotation. The first annotation may identify the first entity type explicitly within the first annotation (e.g., by specifying a parameter such as type=User.class). In step 406, a second entity type is identified using the second annotation. In one embodiment, the second entity type may be different from the first entity type. In step 408, a first operation corresponding with the first entity type is identified using the first annotation. In step 410, a second operation corresponding with the second entity type is identified using the second annotation. In one example, the first operation of the first entity type may correspond with a createUser method for a User entity and the first annotation may correspond with an annotation such as annotation 312 in FIG. 3A. The second operation of the second entity type may correspond with an updateRole method for a Role entity and the second annotation may correspond with an annotation such as annotation 354 in FIG. 3C.

In step 412, one or more attributes associated with the first entity type are identified. In one example, the first entity type may comprise a User entity and the one or more attributes may include a user name attribute, a user identification attribute, a role attribute, and a date of birth attribute. In some cases, the first operation of the first entity type may correspond with a method for updating one or more of the one or more attributes. For example, the first operation of the first entity type may correspond with an UpdateRelationship method for a User entity and the first annotation may correspond with an annotation such as annotation 332 in FIG. 3B. Within a programming module, the first annotation may be arranged directly above or may directly precede a method or function call corresponding with the first operation.

In step 414, a relationship between the first entity type and the second entity type is determined. In one embodiment, the relationship between the first entity type and the second entity type may be determined via a third annotation embedded within the one or more program modules or by introspecting or parsing properties associated with the first entity type that are defined within a definition of the second entity type (e.g., by parsing a class definition for the second entity type to identify properties of the second entity type). In one example, an annotation may specify the relationship between a User entity and a Role entity in which a new Role may replace an old Role for a User. In another embodiment, the relationship between the first entity type and the second entity type may be determined automatically by parsing classes or other data structures associated with the first entity type and the second entity type to identify corresponding properties of the first entity type or second entity type. The first operation and the second operation may comprise methods within the application. In one example, a Java class associated with a User entity may be parsed to identify various properties, such as a role property. The methods within the one or more program modules may comprise functions or procedures used by the application. A class may provide a blueprint or structure for creating a corresponding object or instantiation of the class for the application. A class may also include one or more methods associated with the class.

In step 416, a normalized metadata repository is generated and stored. The normalized metadata repository may include at least the first operation corresponding with the first entity type, the second operation corresponding with the second entity type, and the relationship between the first entity type and the second entity type. In some cases, the one or more program modules may comprise Java code and the normalized service model generator may be deployed inside a Java container and be used for exposing Open Data Protocol (OData) REST APIs. OData may allow a client or service requester to make requests and get responses from an OData service using RESTful interactions (e.g., CRUD operations). The data output from the OData service may be represented, for example, using XML or JSON.

Figure 4B:
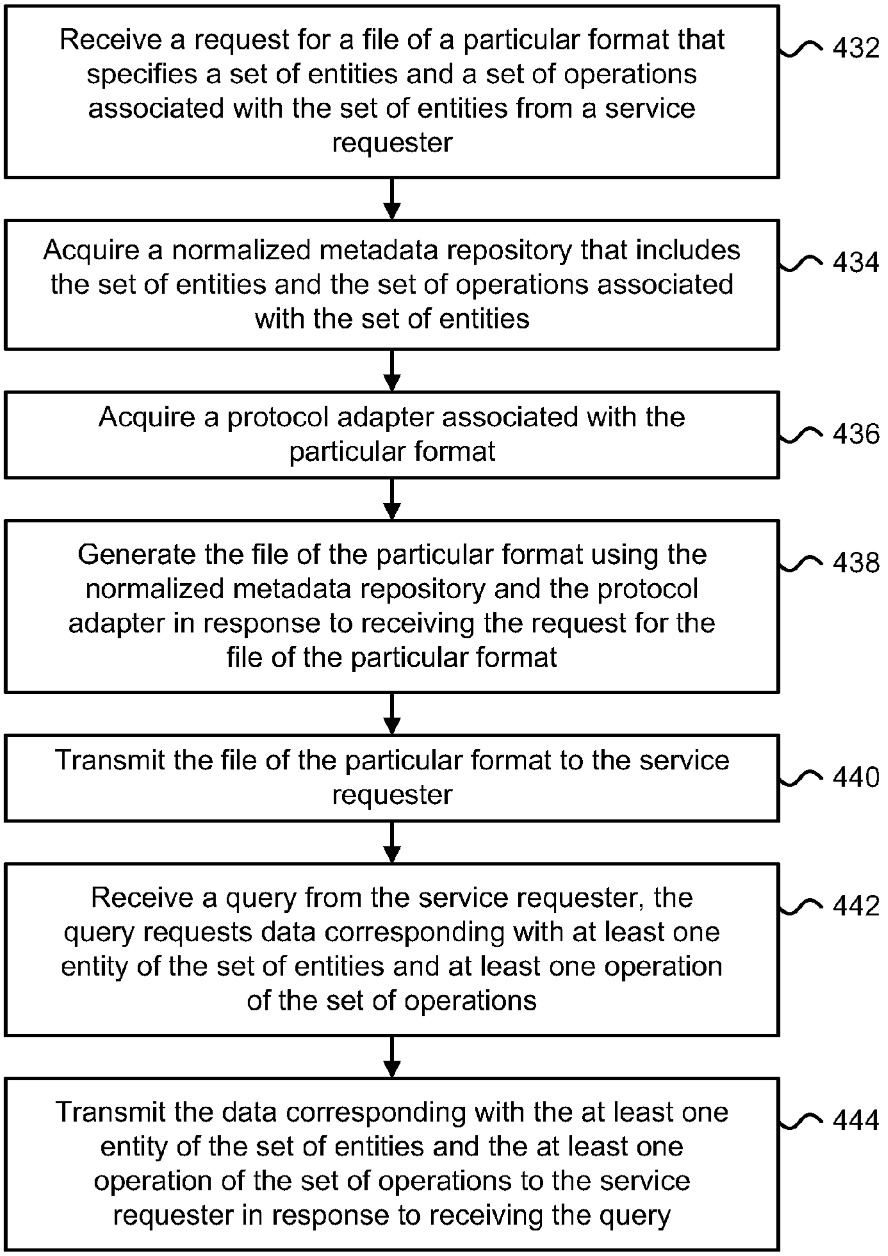
FIG. 4B is a flowchart describing one embodiment of a process for generating a file of a particular format using a normalized metadata repository.

FIG. 4B is a flowchart describing one embodiment of a process for generating a file of a particular format using a normalized metadata repository. In one embodiment, the process of FIG. 4B may be performed by a server, such as server 160 in FIG. 1.

In step 432, a request for a file of a particular format that specifies a set of entities and a set of operations associated with the set of entities is received from a service requester. In one example, the service requester may comprise an application running on a computing device and the particular format may comprise the JSON file format. The request may comprise an HTTP request or be associated with a particular transport protocol. In some cases, a request for a resource (or web resource) that specifies a set of entities and a set of operations associated with the set of entities may be received from the service requester. The resource may correspond with an electronic document or a file.

In step 434, a normalized metadata repository is acquired. The normalized metadata repository includes data corresponding with the set of entities and the set of operations associated with the set of entities. In step 436, a protocol adapter associated with the particular format is acquired. The protocol adapter may map data from the normalized metadata repository into fields associated with the file of the particular format. In step 438, the file of the particular format is generated using the normalized metadata repository and the protocol adapter in response to receiving the request for the file of the particular format. In step 440, the file of the particular format is transmitted to the service requester. The file of the particular format may be transported within an HTTP response or using a response associated with a particular request-response transport protocol. In step 442, a query from the service requester is received. The query may request data corresponding with at least one entity of the set of entities and at least one operation of the set of operations. In step 444, the data corresponding with the at least one entity of the set of entities and the at least one operation of the set of operations is transmitted to the service requester in response to receiving the query.

One embodiment of the disclosed technology includes receiving an HTTP request for a file of a particular format from a service requester. The file specifies a set of entities and a set of operations associated with the set of entities. The method further comprises accessing a normalized metadata repository that includes data corresponding with the set of entities and the set of operations associated with the set of entities, acquiring a protocol adapter associated with the particular format, generating the file of the particular format using the normalized metadata repository and the protocol adapter in response to receiving the request for the file of the particular format, and transmitting an HTTP response to the service requester that includes the file of the particular format.

One embodiment of the disclosed technology includes a memory in communication with a set of processors. The memory stores a normalized metadata repository that includes data corresponding with a set of entities and a set of operations associated with the set of entities. The set of processors receives an HTTP request for a file of a particular format from a service requester. The file specifies the set of entities and the set of operations associated with the set of entities. The set of processors access the normalized metadata repository and acquire a protocol adapter associated with the particular format. The set of processors generate the file of the particular format using the normalized metadata repository and the protocol adapter in response to receiving the request for the file of the particular format and transmit an HTTP response to the service requester that includes the file of the particular format.

Figure 5:
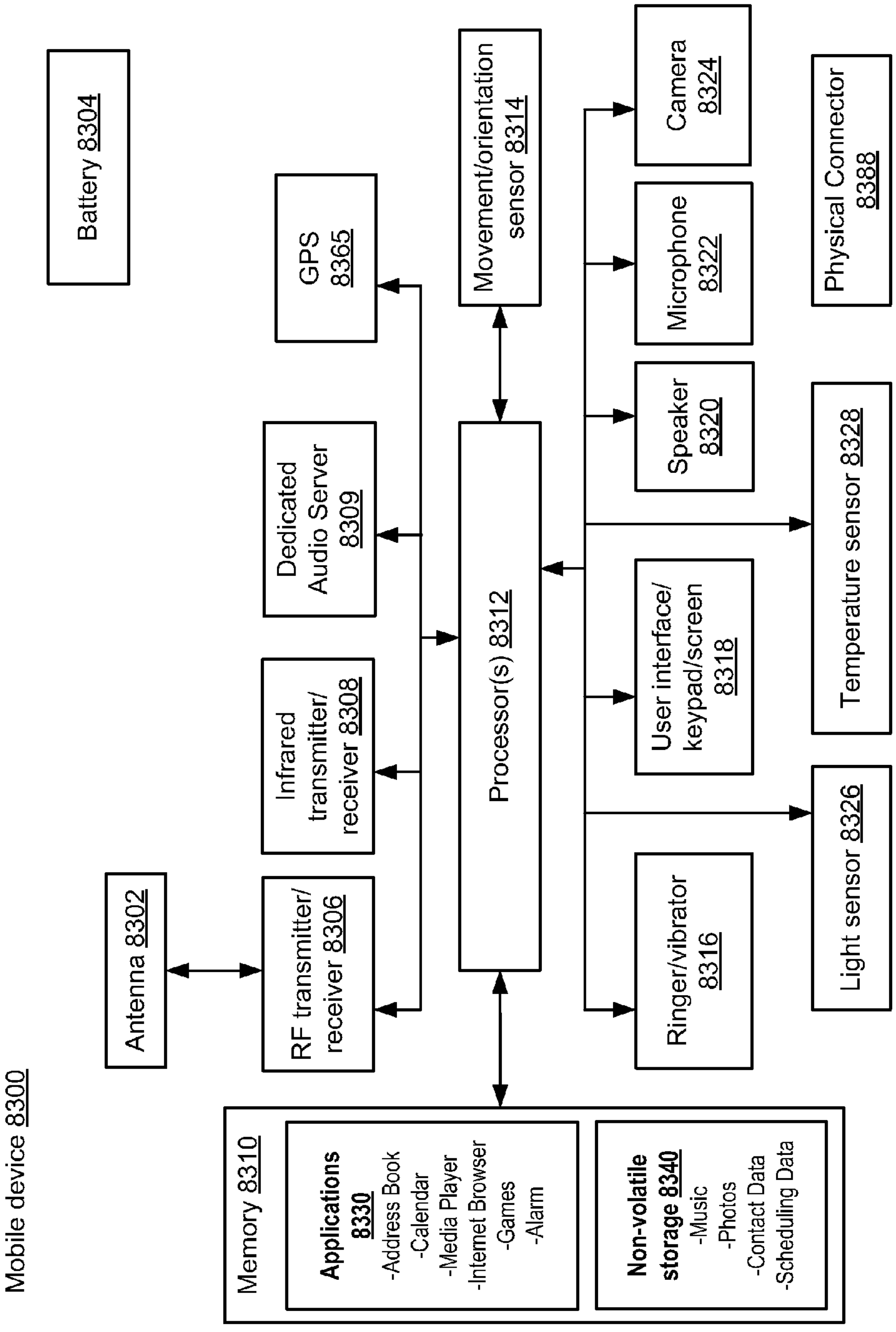
FIG. 5 depicts one embodiment of a mobile device.

The disclosed technology may be used with various computing systems. FIG. 5 depicts one embodiment of a mobile device 8300, which includes one example of an implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, reference in the specification to "an embodiment," "one embodiment," "some embodiments," or "another embodiment" may be used to describe different embodiments and do not necessarily refer to the same embodiment.

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for translating web APIs, comprising:

receiving a request for a resource in a particular format that specifies a set of entities and a set of operations associated with the set of entities from a service requester, the service requester comprises an application running on a computing device;

generating a normalized metadata repository, the generating the normalized metadata repository includes acquiring one or more program modules, the one or more program modules include a first annotation corresponding with a first method and a second annotation corresponding with a second method, the generating the normalized metadata repository includes identifying a first operation corresponding with a first entity type using the first annotation and identifying a second operation correspond with a second entity type different from the first entity type using the second annotation, the generating the normalized metadata repository includes identifying a relationship between the first entity type and the second entity type using the properties of first entity type defined in the second entity type;

accessing the normalized metadata repository that includes data corresponding with the set of entities and the set of operations associated with the set of entities;

acquiring a protocol adapter associated with the particular format;

generating the resource in the particular format using the normalized metadata repository and the protocol adapter in response to receiving the request for the resource in the particular format, the generating the resource in the particular format is performed using a server in communication with the computing device; and transmitting a response to the service requester that includes the resource in the particular format.

2. The method of claim 1, wherein:

the receiving the request comprises receiving an HTTP request for the resource in the particular format, the resource comprises a file in the particular format; and the transmitting a response comprises transmitting an HTTP response to the service requester.

3. The method of claim 2, further comprising:

receiving a query from the service requester subsequent to the transmitting the HTTP response, the query requests data corresponding with at least one entity of the set of entities and at least one operation of the set of operations; and transmitting the data corresponding with the at least one entity of the set of entities and the at least one operation on the set of operations to the service requester in response to receiving the query.

4. The method of claim 1, wherein:

the particular format comprises one of a JSON file format or an XML file format.

5. The method of claim 1, wherein:

the first annotation comprises a Java annotation; and the one or more program modules comprise Java code.

6. The method of claim 1, wherein:

the first operation comprises a create entity operation; and the second operation comprises an update entity operation.

7. The method of claim 1, wherein:

the first entity type comprises a User entity; and the second entity type comprises a Role entity.

8. The method of claim 1, wherein:

the generating the resource in the particular format comprises generating the resource without requiring a change to the one or more program modules.

9. A system, comprising:

a memory, the memory configured to store a normalized metadata repository that includes data corresponding with a set of entities and a set of operations associated with the set of entities; and a set of processors in communication with the memory, the set of processors configured to receive a request for a file of a particular format from a service requester, the file specifies the set of entities and the set of operations associated with the set of entities, the set of processors configured to access the normalized metadata repository and acquire a protocol adapter associated with the particular format, the set of processors configured to generate the file of the particular format using the normalized metadata repository and the protocol adapter in response to receiving the request for the file of the particular format and transmit a response to the service requester that includes the file of the particular format, the set of processors configured to acquire one or more program modules associated with an application, the one or more program modules include a first annotation corresponding with a first method and a second annotation corresponding with a second method, the set of processors configured to identify a first operation corresponding with a first entity type using the first annotation and identify a second operation correspond with a second entity type different from the first entity type using the second annotation, set of processors configured to identify a relationship between the first entity type and the second entity type using a third annotation embedded within the one or more program modules, the normalized metadata repository configured to store at least the first operation corresponding with the first entity type and the relationship between the first entity type and the second entity type.

10. The system of claim 9, wherein:

the service requester comprises an application running on a mobile computing device;

the request comprises an HTTP request; and the response comprises an HTTP response.

11. The system of claim 10, wherein:

the set of processors configured to receive a query from the service requester subsequent to transmitting the HTTP response, the query requests data corresponding with at least one entity of the set of entities and at least one operation of the set of operations, the set of processors configured to transmit the data corresponding with the at least one entity of the set of entities and the at least one operation on the set of operations to the service requester in response to receiving the query.

12. The system of claim 9, wherein:

the particular format comprises one of a JSON file format or an XML file format.

13. The system of claim 9, wherein:

the first annotation comprises a Java annotation; and the one or more program modules comprise Java code.

14. The system of claim 9, wherein:

the first operation comprises a create entity operation; and the second operation comprises an update entity operation.

15. The system of claim 9, wherein:

the first entity type comprises a User entity; and the second entity type comprises a Role entity.

16. The system of claim 9, wherein:
the set of processors generate the file of the particular format without requiring a change to the one or more program modules.

17. The system of claim 9, wherein:
the memory comprises a non-volatile memory.

18. A computer program product, comprising:
a non-transitory computer readable storage medium having computer readable program code embodied therewith, the computer readable program code comprising:
computer readable program code configured to receive an HTTP request for a file of a particular format from a service requester, the file specifies a set of entities and a set of operations associated with the set of entities;
computer readable program code configured to acquire one or more program modules associated with an application, the one or more program modules include a first annotation corresponding with a first method and a second annotation corresponding with a second method, the computer readable program code configured to identify a first operation corresponding with a first entity type using the first annotation and identify a second operation correspond with a second entity type different from the first entity type using the second annotation, the computer readable program code configured to identify a relationship between the first entity type and the second entity type using a third annotation embedded within the one or more program modules;
computer readable program code configured to access a normalized metadata repository that includes data corresponding with the set of entities and the set of operations associated with the set of entities, the normalized metadata repository configured to store at least the first operation corresponding with the first entity type and the relationship between the first entity type and the second entity type;
computer readable program code configured to acquire a protocol adapter associated with the particular format;
computer readable program code configured to generate the file of the particular format using the normalized metadata repository and the protocol adapter in response to receiving the request for the file of the particular format;
computer readable program code configured to transmit an HTTP response to the service requester that includes the file of the particular format;
computer readable program code configured to receive a query from the service requester subsequent to the transmitting the HTTP response, the query requests data corresponding with at least one entity of the set of entities and at least one operation of the set of operations; and
computer readable program code configured to transmit the data corresponding with the at least one entity of the set of entities and the at least one operation on the set of operations to the service requester in response to receiving the query, the particular format comprises a JSON file format.

* * * * *